United States Patent [19]
Ottersbach et al.

[11] Patent Number: 6,089,575
[45] Date of Patent: Jul. 18, 2000

[54] SEALED SEAT FOR A HYDRAULIC SWITCHING ELEMENT IN A MOUNTING SPACE FOR A DIRECT-CONTROLLED CARTRIDGE VALVE IN AN INSERTION BORE

[75] Inventors: Rainer Ottersbach, Erlangen; Andreas Strauss, Herzogenaurach, both of Germany

[73] Assignee: INA Walzlager Schaeffler oHG, Germany

[21] Appl. No.: 09/037,300

[22] Filed: Mar. 9, 1998

[30] Foreign Application Priority Data

Mar. 15, 1997 [DE] Germany .......................... 197 10 869

[51] Int. Cl.⁷ ........................................ F16J 15/02
[52] U.S. Cl. ........................ 277/637; 277/642; 277/907; 277/927
[58] Field of Search ............................. 137/454.2, 454.6; 277/447, 630, 637, 641, 642, 907, 909, 927

[56] References Cited

U.S. PATENT DOCUMENTS

| | | | |
|---|---|---|---|
| Re. 25,920 | 11/1965 | Moen | 137/454.2 |
| 2,506,111 | 5/1950 | Saint | 277/907 |
| 2,650,869 | 9/1953 | Marien | 277/447 |
| 2,719,767 | 10/1955 | Ernest | 277/447 |
| 2,927,831 | 3/1960 | Tuczek | 277/909 |
| 4,540,185 | 9/1985 | Hoult | 277/447 |
| 5,245,997 | 9/1993 | Bartos | 128/205.24 |

FOREIGN PATENT DOCUMENTS

| | | |
|---|---|---|
| 2746260 | 4/1978 | Germany . |
| 4218082 | 12/1993 | Germany . |
| 4340455 | 8/1994 | Germany . |
| 4434142 | 3/1996 | Germany . |
| 4435870 | 4/1996 | Germany . |
| 48487 | 5/1996 | Germany . |
| 19502496 | 8/1996 | Germany . |

*Primary Examiner*—Anthony Knight
*Assistant Examiner*—Vishal Patel
*Attorney, Agent, or Firm*—Bierman, Muserlian & Lucas

[57] ABSTRACT

A sealing arrangement for a direct-controlled cartridge valve in an insertion bore, which valve is arranged in a hydraulic system of a device for varying the valve timing of an internal combustion engine wherein to avoid leakages between the individual annular chambers (20, 21, 22) in the insertion bore (23) resulting from the radial clearance between the annular webs (8, 9, 10) of the cartridge (5) and the bore wall (24) of the insertion bore (23), the annular webs (8, 9, 10) on the outer peripheral surface (6) of the cartridge (5) are made with a smaller diameter than the insertion bore (23) and additionally comprise annular grooves (14, 15, 16) into which annular sealing elements (17, 18, 19) made of a shear-resistant material are inserted, and leakages between the sealing elements (17, 18, 19) and the cartridge (5), as also leakages between the sealing elements (17, 18, 19) and the bore wall (24) of the insertion bore (23) are sealed by a static radial force resulting from the pre-stress of the sealing elements (17, 18, 19) and/or by a dynamic sealing force resulting from pressure differences of the hydraulic pressure medium between the individual annular chambers (20, 21, 22).

3 Claims, 1 Drawing Sheet

SEALED SEAT FOR A HYDRAULIC SWITCHING ELEMENT IN A MOUNTING SPACE FOR A DIRECT-CONTROLLED CARTRIDGE VALVE IN AN INSERTION BORE

FIELD OF THE INVENTION

A sealing arrangement for a hydraulic switching element in a mounting space, and more particularly for a direct-controlled cartridge valve in an insertion bore, which valve is arranged in a hydraulic system of a device for varying the valve timing of an internal combustion engine, said cartridge valve comprising a cylindrical housing enclosing an actuator and having a sealing flange at one end, said flange merging into a hollow cylindrical cartridge which surrounds an axially displaceable control element, said cartridge comprising rows of circumferentially spaced radial openings and a plurality of annular webs arranged on its outer peripheral surface, which webs divide the outer peripheral surface having the radial openings into a plurality of hydraulically separated annular sections and, in the installed state, define together with the bore wall of the insertion bore, a plurality of annular chambers in said bore, each of which chambers is connected to a pressure medium supply duct opening radially into the insertion bore.

BACKGROUND OF THE INVENTION

Direct-controlled valves of the above type are generally known in the art as a specific form of hydraulic switching elements belonging to the group of proportional distributing valves. Due to their compact structure and inexpensive manufacture, and also because of their simple exchangeability and excellent switching properties, such cartridge valves are also being increasingly used in internal combustion engines equipped with a device for varying valve timing. Within the hydraulic system of these devices, the cartridge valves control the flow of engine oil from the oil supply point to the adjusting device and back into the crankcase of the internal combustion engine. The cartridge valves are generally arranged in an insertion bore having approximately the same diameter as the annular webs of the cartridge valve in the cylinder head of the internal combustion engine. The pressure medium supply ducts open radially into this insertion bore which one attempts to make by the simplest possible manufacturing procedure so that it forms, together with the annular webs of the cartridge, an annular gap seal between the individual annular chambers in the insertion bore.

Notwithstanding a precise fabrication of the insertion bore and the cartridge, it has been determined that the radial clearance between the radial webs of the cartridge and the bore wall of the insertion bore is occasionally so large that leaks or hydraulic short circuits occur between the annular chambers in the insertion bore so that an adequate hydraulic support of the adjusting piston of the adjusting device is no longer guaranteed. The influence of the radial clearance on leakage can certainly be compensated for by the choice of an appropriate length of the annular gap (wider annular webs) but this requires a certain additional amount of axial design space which is often not available.

To avoid leakages resulting from the radial clearance, two narrower, spaced annular webs were provided in place of each annular web on the cartridge valve and an O-ring seal was arranged in the space between the annular webs. When such cartridge valves are inserted into the insertion bore, the O-ring seals which extend radially beyond the annular webs can be sheared off in the region of the radial pressure medium supply ducts in the insertion bore due to the sharp edges of the duct openings so that, in this case too, tightness between the annular chambers is not guaranteed. To avoid this problem, the radial pressure medium supply ducts in the insertion bore are made as stepped bores, or comprise a countersink at the transition to the insertion bore. In both cases, the transition from the insertion bore to the radial pressure medium supply ducts is tapered so that the danger of shearing of the O-ring seals during the insertion of the cartridge valve into the insertion bore is reduced. The fabrication of an insertion bore with pressure medium supply ducts of the aforesaid type is, however, rather complicated and consequently expensive.

As an alternative solution for avoiding the high costs involved in the making of these stepped bores, DE-OS 44 34 142 proposes a method for the mounting of a first element in a second element. Before insertion of the first element into the second element, the sealing members together with the first element are deformed in a receptacle of a cooling device to the extent to which they would also be deformed in their installed state. The sealing elements are cooled in this deformed state so far that their state of elastic deformation is maintained for some time. Since the sealing elements now no longer protrude beyond the first element, said first element together with the sealing elements can now be installed with ease in the second element. After assembly, the sealing elements return to normal temperature and reacquire their elastic properties. However, this method requires separate cooling devices which, due to their manufacturing, maintenance and energy costs and also because of the prolongation of assembly time by the cooling operation, have a negative effect on the total mounting costs.

OBJECTS OF THE INVENTION

It is an object of the invention to provide an economic sealed seat for a hydraulic switching element, and more particularly for a direct-controlled cartridge valve in an insertion bore, which, while avoiding both stepped bores for the pressure medium supply ducts and shearing of the sealing elements, reduces to a minimum, the leakages between the individual annular chambers resulting from the radial clearance between the radial webs of the cartridge and the bore wall of the insertion bore.

This and other objects and advantages of the invention will become obvious from the following detailed description.

SUMMARY OF THE INVENTION

The sealed seat of the invention for a hydraulic switching element in a mounting space, and more particularly for a direct-controlled cartridge valve in an insertion bore, which valve is arranged in a hydraulic system of a device for varying the valve timing of an internal combustion engine, said cartridge valve comprising a housing enclosing an actuator and having a sealing flange at one end, said flange merging into a hollow cylindrical cartridge which surrounds an axially displaceable control element, said cartridge comprising rows of circumferentially spaced radial openings and a plurality of annular webs arranged on its outer peripheral surface, which webs divide the outer peripheral surface having the radial openings into a plurality of hydraulically separated annular sections and, in the installed state, define together with the bore wall of the insertion bore, a plurality of annular chambers in said bore, each of which chambers is connected to a pressure medium supply duct opening radially into the insertion bore, is characterized in that the annular webs on the outer peripheral surface of the cartridge are made with a smaller diameter than the insertion bore and additionally comprise annular grooves into which annular sealing elements made of a shear-resistant material can be inserted, and leakages between the sealing elements and the cartridge, as also leakages between the sealing elements and the bore wall of the insertion bore are sealed by a static radial force resulting from a pre-stress of the sealing elements and by a dynamic sealing force resulting from pressure differences of the hydraulic pressure medium between the individual annular chambers.

The invention achieves the above objects with a direct-controlled cartridge valve of the type by the fact that the annular webs on the outer peripheral surface of the cartridge are made with a smaller diameter than the insertion bore and additionally comprise annular grooves into which annular sealing elements made of a shear-resistant material can be inserted, and leakages between the sealing elements and the cartridge, as well as leakages between the sealing elements and the bore wall of the insertion bore are sealed by a static radial force resulting from the pre-stress of the sealing elements and by a dynamic sealing force resulting from pressure differences of the hydraulic pressure medium between the individual annular chambers.

Advantageously, the sealing elements of the invention are made as slit steel sealing rings with a square or rectangle cross-section whose outer diameter can be reduced to at least the inner diameter of the insertion bore, with production of a pre-stress. However, the invention also covers sealing rings made of other shear-resistant materials such as plastics, copper or copper alloys, which, when the slit ends are pressed together radially, possess a certain elasticity or build up their own pre-stress. Known types of slits extending obliquely or in steps from one flank of the slit ring to the other have proved to be an advantageous form of slits in the sealing elements for avoiding pressure medium leakages between these slits as well. Similarly, the proposed square or rectangular cross-section of the sealing elements should only be seen as one preferred cross-section which may also have any other feasible shape. However, the straight peripheral surfaces of square or rectangular cross-sections offer the most effective sealing surfaces relative to the bore wall of the insertion bore and also the most effective pressure application surfaces for producing the dynamic sealing force of the sealing elements through the hydraulic pressure medium.

In a further embodiment of the invention, there additionally exists a radial and an axial clearance between the sealing element and the associated annular groove because the sealing elements are configured so that they have a larger inner diameter than the inner diameter of the groove even under pre-stress and a ring thickness which is smaller than the width of the groove. This radial and axial clearance is required for equipping the sealing elements with the aforesaid dynamic sealing force because the pressure of the pressure medium can thus act both on the part of the flanks of the sealing elements arranged in the annular groove to each annular web and on the inner circumferential surface of the sealing elements. In this way, the sealing elements seal themselves, depending on the direction of pressure, against a radial wall of the annular groove and against the bore wall of the insertion bore.

Thus the sealed seat of the invention for a hydraulic switching element has the advantage over the prior art that, using simple fabrication measures and very little additional material, a cost-effective sealing of a cartridge valve in an insertion bore is created which almost entirely eliminates the leakages of hydraulic medium resulting from the radial clearance between the radial webs and the bore wall in prior art sealing arrangements. Similarly, a configuration of the pressure medium supply ducts in the insertion bore as stepped bores is equally unnecessary with the sealed seat of the invention because the sealing elements can be made of shear-resistant materials.

BRIEF DESCRIPTION OF THE DRAWINGS

The invention will now be described more closely with the help of the attached drawings wherein.

DETAILED DESCRIPTION OF THE DRAWINGS

Figure 1:
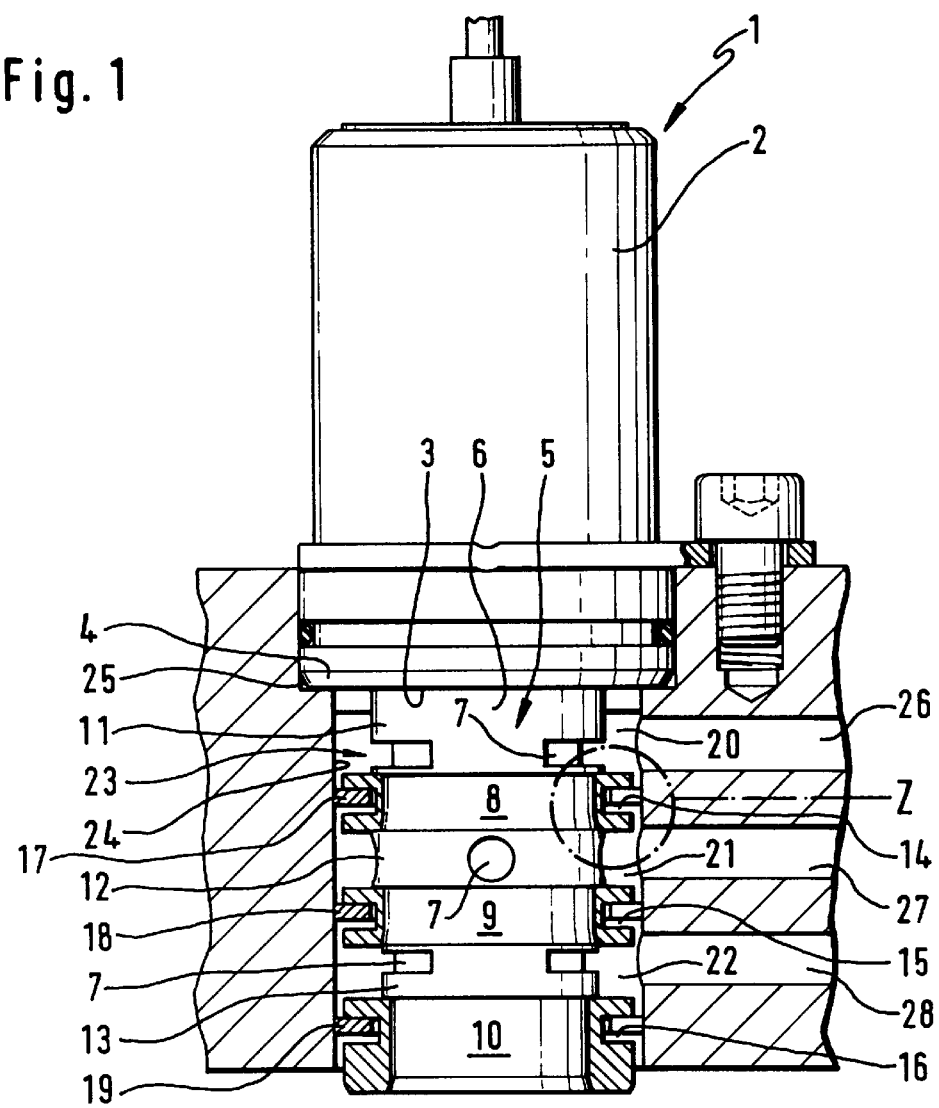
FIG. 1 is a sectional representation of a cartridge valve of the invention arranged in an insertion bore.

FIG. 1 clearly shows a direct-controlled cartridge valve 1, known, per se, in the art, in an installed state within an insertion bore 23 as used in a hydraulic system of a device for varying valve timing in an internal combustion engine. This cartridge valve 1 comprises a cylindrical housing 2 which surrounds an actuator, not visible in the drawing, and is supported on a step 25 in the insertion bore 23 by a sealing flange 4 which, in conjunction with an O-ring seal, not referenced, arranged thereabove seals the insertion bore 23 in the upward direction. The drawing indicates the manner in which the cartridge valve 1 is fixed in the installed state, for example on the cylinder head of an internal combustion engine, by a web plate, not referenced, fixed to the housing 2 and a threaded screw, also not referenced, inserted through the web plate.

FIG. 1 further shows that the housing 2 merges into a hollow cylindrical cartridge 5 having a generally smaller diameter than the housing 2 and enclosing an axially displaceable control element, for example a control piston, not visible in the drawing, the housing 2 comprising on its outer peripheral surface 6, rows of circumferentially spaced radial openings 7 in the form of tangentially electroeroded apertures in the peripheral surface 6. Further, a number of annular webs 8, 9, 10 are arranged on the peripheral surface 6 of the cartridge 5 which divide the peripheral surface 6 having the radial openings 7 into a number of annular sections 11, 12, 13 which are hydraulically separated from one another. In the installed state of the cartridge valve 1 shown in FIG. 1, the annular webs 8, 9 10 define, together with the bore wall 24 of the insertion bore 23, a number of annular chambers 20, 21, 22, each of which is connected to a pressure medium supply duct 26, 27, 28 which opens radially into the insertion bore 23.

To achieve a sealing of the individual annular chambers 20, 21, 22 in the insertion bore 23, the invention provides that the annular webs 8, 9 10 on the peripheral surface 6 of the cartridge 5 have a smaller diameter than the insertion bore 23 and additionally comprise radially centrally arranged annular grooves 14, 15, 16 into which are inserted sealing elements 17, 18, 19 made of a shear-resistant material. The sealing elements 17, 18, 19 are configured so that they seal leakages between themselves and the cartridge 5 as also leakages between themselves and the bore wall 24 of the insertion bore 23 by a static radial force resulting from their own pre-stress and by a dynamic sealing force resulting from pressure differences of the hydraulic pressure medium between the individual annular chambers 20, 21, 22.

Figure 2:
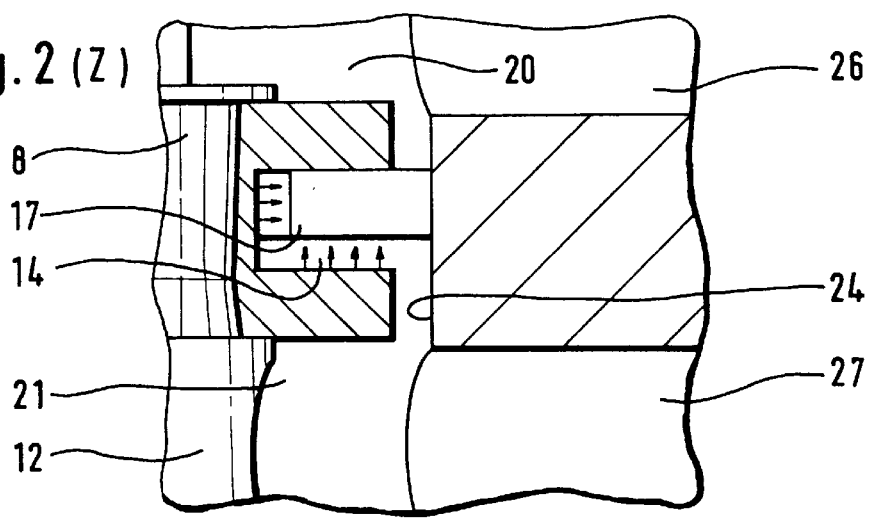
FIG. 2 shows the detail Z of FIG. 1.

In the embodiment of the invention shown by way of example in FIGS. 1 and 2, the sealing elements 17, 18, 19 are made in the most suitable manner in the form of slit steel sealing rings having a rectangular cross-section and whose outer diameter can be reduced to at least the inner diameter of the insertion bore 23 with production of the aforesaid pre-stress. In FIG. 2, it can be clearly seen that the sealing elements have both a radial and an axial clearance to the annular groove 14, 15, 16 due to the fact that they are configured so as to have, even in the pre-stressed state, a larger inner diameter than the inner diameter of the groove and a smaller ring thickness than the groove width. In this way, in addition to the static sealing force of the sealing elements 17, 18, 19 in the direction of the bore wall 24 resulting from the pre-stress, a dynamic sealing force resulting from the pressure of the pressure medium and indicated by arrows in FIG. 2 can be transmitted to the sealing elements 17, 18, 19 in the direction of a radial wall of the annular grooves 14, 15, 16 as well as in the direction of the bore wall 24.

Various modifications of the sealed seat of the invention may be made without departing from the spirit or scope thereof and it is to be understood that the invention is intended to be limited only as defined in the appended claims.

What we claim is:

1. A sealed seat for a hydraulic switching element in a mounting space, and more particularly a direct-controlled cartridge valve in an insertion bore, which valve is arranged in a hydraulic system of a device for varying the valve timing of an internal combustion engine, said cartridge valve (1) comprising a housing (2) enclosing an actuator and having a sealing flange (4) at one end (3), said flange (4) merging into a hollow cylindrical cartridge (5) which surrounds an axially displaceable control element, said cartridge (5) comprising rows of circumferentially spaced radial openings (7) and a plurality of annular webs (8, 9, 10) arranged on its outer peripheral surface (6), which webs divide the outer peripheral surface (6) having the radial openings (7) into a plurality of hydraulically separated annular sections (11, 12, 13) and, in the installed state, define together with the bore wall (24) of the insertion bore (23), a plurality of annular chambers (20, 21 22) in said bore, each of which chambers is connected to a pressure medium supply duct (26, 27 28) opening radially into the insertion bore (23), characterized in that the annular webs are seperate elements (8, 9 10) on the outer peripheral surface (6) of the cartridge (5) and are made with a smaller diameter than the insertion bore (23) and additionally comprise annular grooves (14, 15, 16) into which annular sealing elements (17, 18, 19) made of a shear-resistant material can be inserted, and leakages between the sealing elements (17, 18 19) and the cartridge (5), as also leakages between the sealing elements (17, 18, 19) and the bore wall (24) of the insertion bore (23) are sealed by a static radial force resulting from a pre-stress of the sealing elements (17, 18, 19) and/or by a dynamic sealing force resulting from pressure differences of the hydraulic pressure medium between the individual annular chambers (20, 21, 22).

2. A sealed seat of claim 1 wherein there exists a radial and an axial clearance between the sealing elements (17, 18 19) and the respective annular groove (14, 15, 16) obtained by configuring the sealing elements (17, 18, 19) so that they have a larger inner diameter than an inner diameter of the groove (14, 15, 18) even under pre-stress and a ring thickness which is smaller than a width of the groove (14, 15, 16).

3. A sealed seat for a hydraulic switching element in a mounting space, and more particularly a direct-controlled cartridge valve in an insertion bore, which valve is arranged in a hydraulic system of a device for varying the valve timing of an internal combustion engine, said cartridge valve (1) comprising a housing (2) enclosing an actuator and having a sealing flange (4) at one end (3), said flange (4) merging into a hollow cylindrical cartridge (5) which surrounds an axially displaceable control element, said cartridge (5) comprising rows of circumferentially spaced radial openings (7) and a plurality of annular webs (8, 9, 10) arranged on its outer peripheral surface (6), which webs divide the outer peripheral surface (6) having the radial openings (7) into a plurality of hydraulically separated annular sections (11, 12, 13) and, in the installed stage, define together with the bore wall (24) of the insertion bore (23), a plurality of annular chambers (20, 21, 22) in said bore, each of which chambers is connected to a pressure medium supply duct (26, 27, 28) opening radially into the insertion bore (23), characterized in that the annular webs are separate elements (8, 9, 10) on the outer peripheral surface (6) of the cartridge (5) and are made with a smaller diameter than the insertion bore (23) and additionally comprise annular grooves (14, 15, 16) into which annular sealing elements (17, 18, 19) made of a shear-resistant material can be inserted, and leakages between the sealing elements (17, 18, 19) and the cartridge (5), as also leakages between the sealing elements (17, 18, 19) and the bore wall (24) of the insertion bore (23) are sealed by a static radial force resulting from a prestress of the sealing elements (17, 18, 19) and/or by a dynamic sealing force resulting from pressure differences of the hydraulic pressure medium between the individual annular chambers (20, 21, 22) and the sealing elements (17, 18, 19) are made as slit steel sealing rings with a square or rectangular cross-section whose outer diameter can be reduced to at least an inner diameter of the insertion bore (23), with production of pres-stress.

* * * * *